United States Patent [19]

Kubo et al.

[11] Patent Number: 5,638,181

[45] Date of Patent: Jun. 10, 1997

[54] DUPLEX COPIER CAPABLE OF DIGITALLY ROTATING AN IMAGE ON AT LEAST ONE SIDE OF A DUPLEX COPY SHEET

[75] Inventors: Hiroshi Kubo, Yokohama; Kenzi Hashimoto, Komae; Kaname Yamamoto, Yokohama; Hideo Yamazaki, Tokyo-to, all of Japan

[73] Assignee: Ricoh Company, Ltd., Tokyo, Japan

[21] Appl. No.: 270,244

[22] Filed: Jul. 5, 1994

[30] Foreign Application Priority Data

Jul. 5, 1993 [JP] Japan .................................. 5-191729

[51] Int. Cl.$^6$ .......................... H04N 1/00; H04N 1/387; G03G 21/00; G06K 9/32
[52] U.S. Cl. .................. 358/296; 358/448; 399/364; 382/297
[58] Field of Search ............................... 358/296, 300, 358/448, 452, 498, 488; 355/24, 77, 208, 318–320; 382/296, 297; 399/364, 373, 374, 38, 46

[56] References Cited

U.S. PATENT DOCUMENTS

| | | | |
|---|---|---|---|
| 4,579,446 | 4/1986 | Fujino et al. | 355/24 |
| 4,814,822 | 3/1989 | Acquaviva et al. | 355/319 X |
| 5,301,036 | 4/1994 | Barrett et al. | 358/448 |
| 5,461,459 | 10/1995 | Muramatsu et al. | 358/296 X |

FOREIGN PATENT DOCUMENTS 57-65057   4/1982   Japan .

*Primary Examiner*—Eric Frahm
*Attorney, Agent, or Firm*—Oblon, Spivak, McClelland, Maier & Neustadt, P.C.

[57] ABSTRACT

A duplex copier composed of a reading device which reads the image information written on the original document, which is set on the platen glass, a converting device for converting the image information read by the reading device to a digital signal, an image processor which processes the digital signal in predetermined manner, a copy machine having a duplex copy unit for making duplex copy, and an automatic document feeder which feeds the original document into the platen glass. The duplex copier is controlled to rotate the orientation of the image from that of the first side of the original by 90° or 180° when the image of the original is formed on the duplex copy sheet in various predetermined modes.

10 Claims, 10 Drawing Sheets

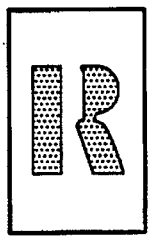
FIG.4C
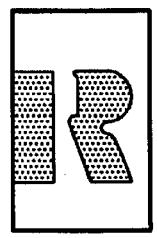
FIG.4D1
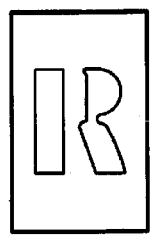
FIG.4D2
FIG.4D3
FIG.4D4
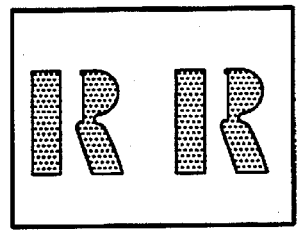
FIG.4D5
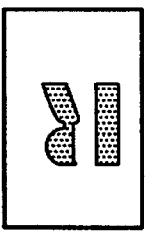
FIG.4D6
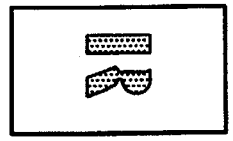
FIG.4D7
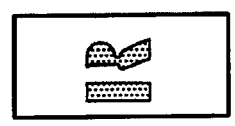
FIG.4D8

| | ONE SIDED ORIGINAL DOCUMENTS ⇒ DUPLEX COPY | | JUDGEMENT | |
|---|---|---|---|---|
| | ORIGINAL DOCUMENT | COPY SHEET | · | CORRECTION |
| 1 | R1  R2  ←A | R1 ᴙ2  ←B | X | R1 ᴙ2 |
| 2 | R1  R2  ←A | R1 ᴙ2  ←B | O | |
| 3 | R1  R2  ←A | R1 ᴙ2  ←B | O | |
| 4 | R1  R2  ←A | R1 ᴙ2  ←B | X | R1 ᴙ2 |

FIG.5

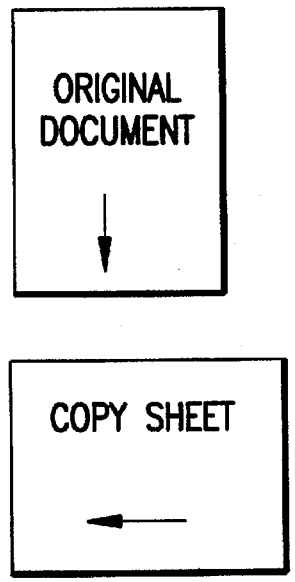
FIG.7
 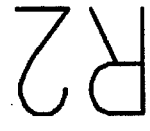  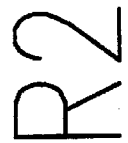
FIG.8a     FIG.8b     FIG.8c     FIG.8d
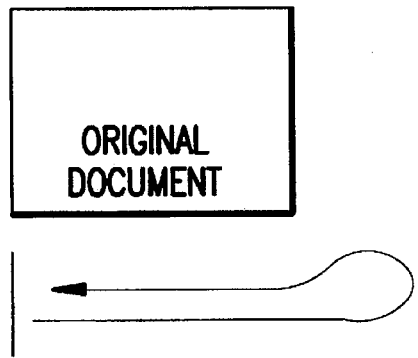 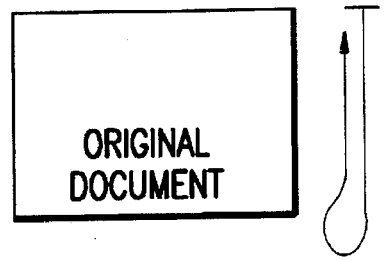
FIG.9a            FIG.9b

DUPLEX COPIER CAPABLE OF DIGITALLY ROTATING AN IMAGE ON AT LEAST ONE SIDE OF A DUPLEX COPY SHEET

FIELD OF THE INVENTION

The present invention relates to an improvement of duplex copying. In particular, many kinds of documents having letters written in a different direction thereon are utilized as an original for duplex copying.

BACKGROUND OF THE INVENTION

In the conventional copier, there exists a certain problem of setting the cassette into the copier in which the blank paper is accommodated. Namely, the copier becomes sophisticated and needs many different kinds of copy paper. However, there exists a limited number of cassettes which can be set therein with regard to the scale of the copier.

In these circumstances, the manner of setting the cassette in the conventional copier is designed roughly in two ways. One way is that each of the different sized copy sheets are accommodated in each of the different cassettes having different sizes. Each of the cassettes is set in the direction in which the copy sheets accommodated therein are most frequently fed. Another way is that the same sized copy sheets are dividedly set into different cassettes having the same size. One of the cassettes is set into the copier body in the longitudinal direction and another is in the lateral direction.

In the above systems, the direction of the feeding for the same size copy sheets is limited to one. Therefore, when a duplex copy is made from the original having the image only on one side thereof and is fed by an automatic document feeder (ADF), the duplex copy becomes inconsistent with the other side thereof, depending on the direction of the letter written thereon. Namely, either the letter is written from top to bottom or from left to right on the original document.

Further, in the conventional copier, the copy sheet having an A-3 size is fed in a direction parallel with the longitudinal direction thereof to avoid the copier body size from becoming too large. Therefore, when the computer format having A-3 size is utilized as an original document, and is fed by the ADF in the direction in parallel with the width thereof, the direction of feeding originals should be designed in close relation with that of the copy sheet. However, in such a copier, the duplex copies become inconsistent with each other because of the inverting of the copy sheet, on one side of which a toner image is transferred during the refeeding process.

SUMMARY OF THE INVENTION

The invention includes a duplex copier composed of a reading device which reads the image information written on the original document, which is set on the platen glass, a converting device for converting the image information read by the reading device to a digital signal, an image processor which processes the digital signal in predetermined manner, a copy machine having a duplex copy and an automatic document feeder which feeds the original document onto the platen glass.

The duplex copier is controlled to rotate the orientation of the image from that of the first side of the original by 90° or 180°, when the image of the original is formed on the duplex copy sheet in various predetermined modes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A–4E are operational diagrams including a pictorial view of the present invention;

FIG. 5 is a table showing the relation of the direction of feeding the letter between the duplex copy sheet and the original document to be copied and having an image only on one side thereof;

FIG. 7 is a pictorial view showing the relation of the direction between the copy sheet and the original document;

FIGS. 8a–8d are pictorial views showing a step of converting a letter;

FIGS. 9a–9b are pictorial views showing the feeding direction of the original document fed by the auto document feeder.

DETAILED DESCRIPTION OF THE PREFERRED EMBODIMENTS

Figure 1:
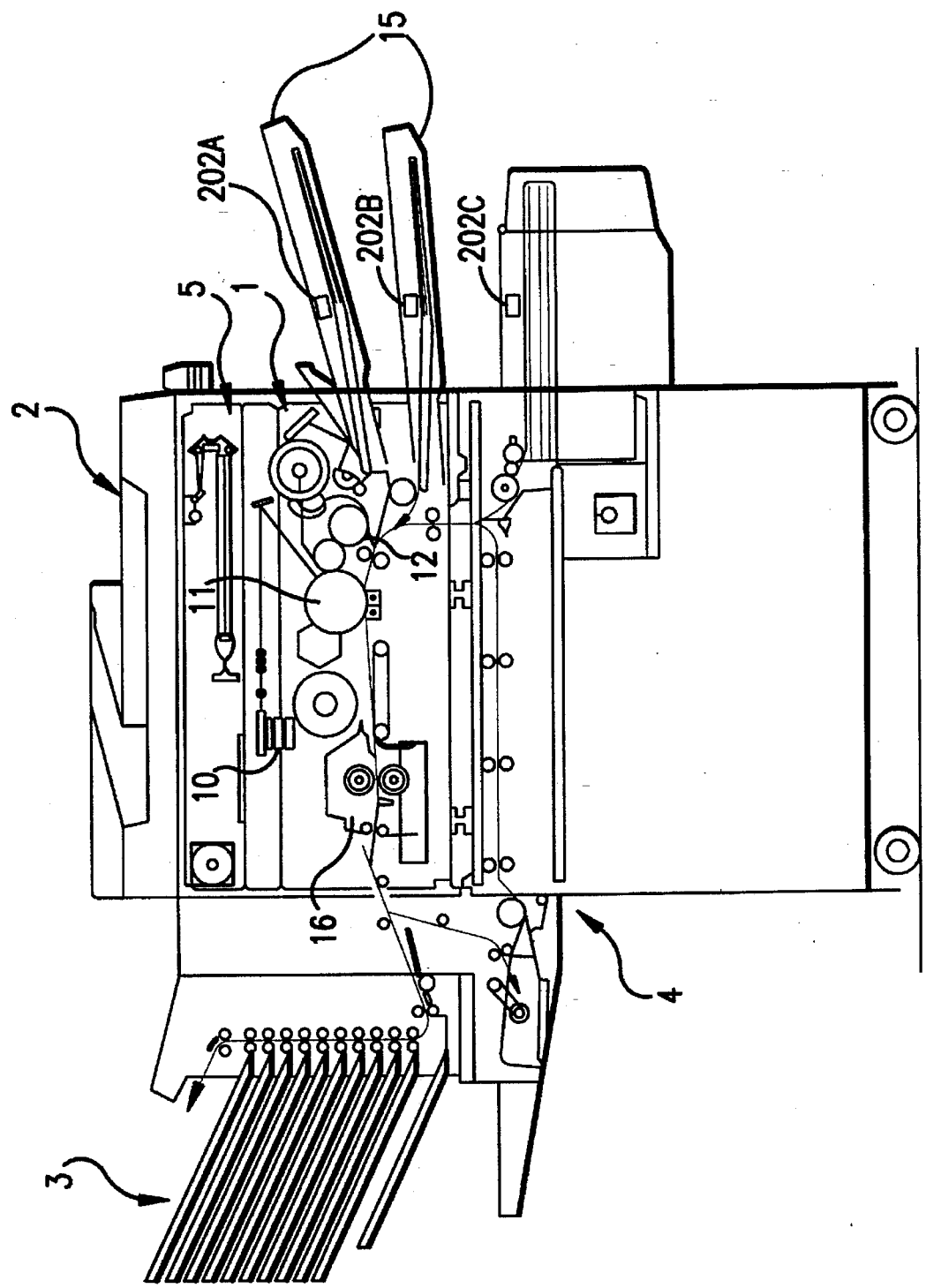
FIG. 1 is a cross-sectional view of a duplex copier employing the present invention.
Figure 3:
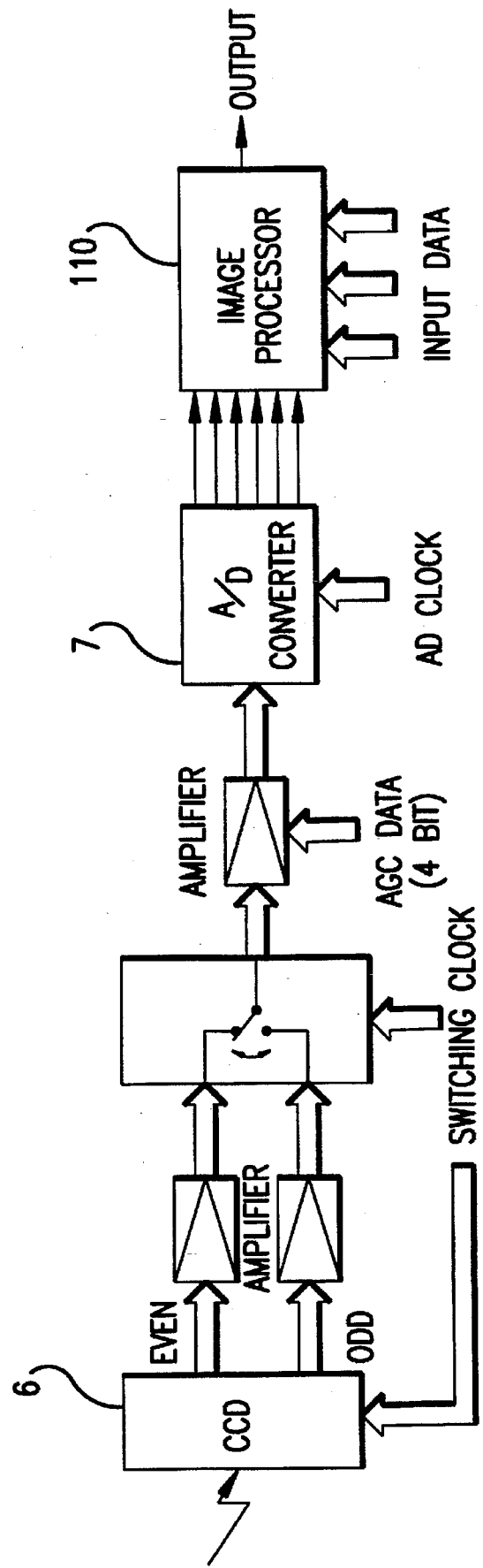
FIG. 3 is a block diagram showing the process of the present invention.

Referring now to the drawings, wherein like reference numerals designate identical or corresponding parts throughout the several views, and more particularly to FIG. 1 thereof, there is illustrated a cross-sectional view of the digital copier employing the present invention having the function of rotating an orientation of the image information during processing of the digital information as explained later. Namely, there is provided an automatic document feeder (ADF) 2 on a platen glass of the digital copier 1, a sorter 3 disposed at the outlet of the copier and the duplex unit 4 disposed below. The reflected light scanned by the scanner 5 and having the image information is focused at the CCD 6 as shown in FIG. 3. CCD 6 converts the optical information to electrical information which is further converted from analog data to digital data by the A/D converter 7 (See FIG. 3). The digital signal is input to the image processor 110 and processed in a predetermined manner explained later.

Figure 4A:
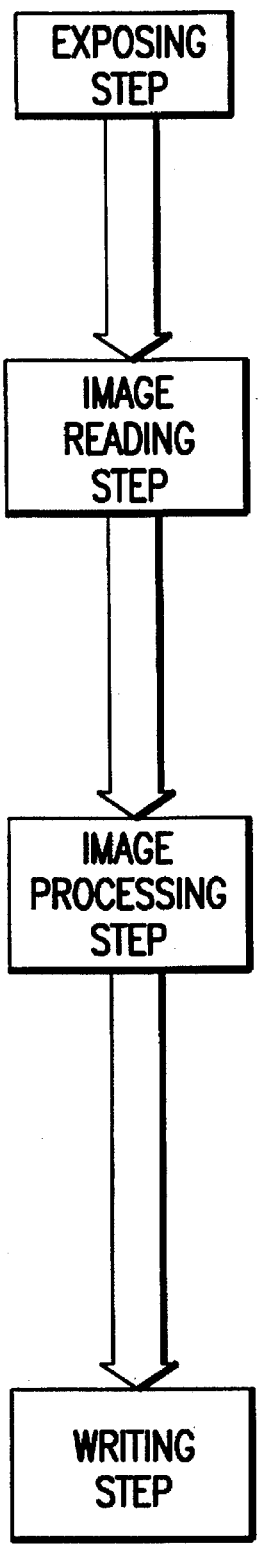
Figure 4B:
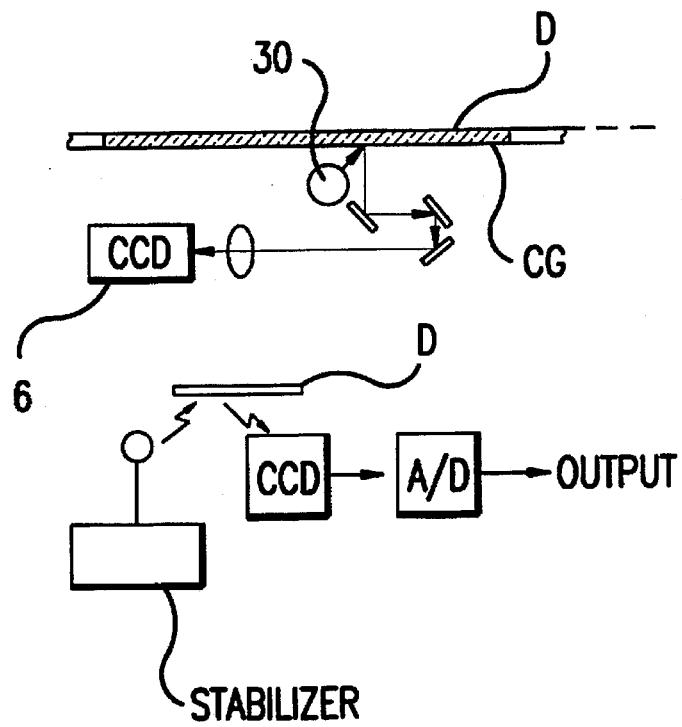

The duplex unit 4 inverts the copy sheet having the transferred toner image on one side thereof and re-feeds the same to the transferring position. A latent image is formed on a photo-conductive drum 11 by the writing device 10 by irradiating a laser beam generated in response to the image signal processed by the image processor (See FIGS. 3, 4A and 4B). The visualized image, which is developed by the developing device 12, is transferred to the copy sheet fed from one of the sheet cassettes 15, and fixed by the fixing device 16 and further ejected through the outlet of the copier machine 1 to the sorting device 3. In the duplex copy mode, the copy sheet having an image on one side thereof is inverted and fed to the duplex tray 4. Next, the copy sheet is re-fed to the photo-conductive drum 11 so that the next image formed thereon is transferred to the other side thereof (See FIG. 1). The copy sheet having the toner image is then fixed by the fixing device 16 and ejected to the outside of the copier machine 1.

Figure 2:
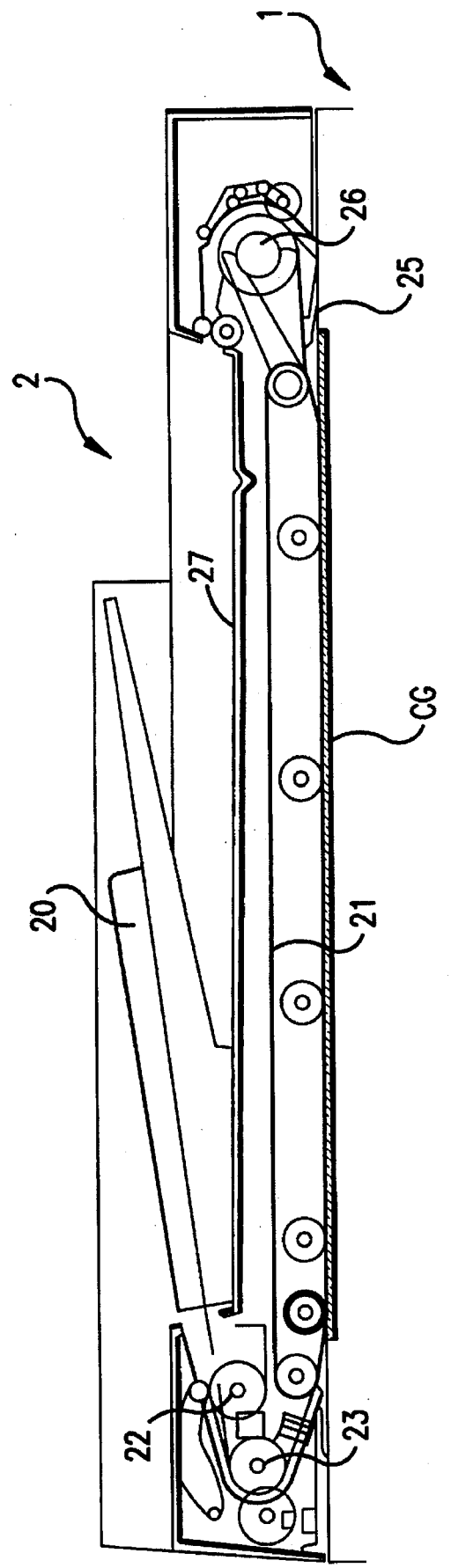
FIG. 2 is a cross-sectional view of an automatic document feeder.

The automatic document feeder 2 is pivotally attached to the copier body 1 to open and close against the contact glass CG. ADF 2 can feed an original to the contact glass CG when closed. The automatic document feeder 2 is composed of an original document table 20 and a transferring belt 21 disposed below thereof (See FIG. 2). The original document to be copied is set on the original table 20 face-up and having the pages in order. The original document is fed from the bottom of the stack of pages by a roller 22 one by one and further fed through a separating roller 23 to the contact glass CG.

When a duplex copy is executed from an original document having an image only on one side thereof, an exposing of the original on the contact glass is made after the original document is stopped at a stopper 25 and a motor not shown in the figures for feeding the original document is stopped. After that, the motor starts rotating again and the stopper 25 is withdrawn in response to a signal generated in the copier body indicating exchanging of the original documents on the contact glass CG. Thereby, the original document already exposed is ejected from the contact glass CG and a new one is fed thereto.

When a duplex copy is made from an original document having an image on both sides thereof, the original document is set in a same manner as in the case of copying from the original having the image only on one side thereof. Namely, the original is set on the table in order of the pages thereof, and in a state that the first page thereof is facing up, and the lowermost original is withdrawn from the table. The original withdrawn from the table is facing up at first at the contact glass, so that it passes the contact glass without being exposed and is further fed around an inverting roller 26. Thereby, the original is inverted and set to the contact glass CG again in a state of the last page of the original being face down thereto. After that, an exposing is executed against the last page of the original. Then, the last page of the original is inverted again during a passage around the inverting roller 26 and set to the contact glass CG again in a state of the other side of the last page is facing down. An exposing for the other side of the original is executed, and after that, the original is ejected through the inverting roller 26 to a receiving table 27.

A process of scanning the original document and forming an image corresponding thereto on the photo-conductive drum 11 is explained below with reference to FIG. 4. In an image reading step, a fluorescent light 30 irradiates the original document and light reflected off of the document is input to an image reading part having CCD 6 through optical devices composed of a mirror and a lens. The CCD produces an electrical signal according to the intensity of the light beam of the reflected fluorescent light 30. After that, an A/D converter converts the electrical signal from an analog form to a digital form.

In an image processing step, the digital signal is electrically processed as described below. This step can change the orientation of the image. For example, the orientation of an original illustrated in FIG. 4C can be rotated by either 180° or 90° in either a clockwise or counter clockwise direction (See FIGS. 4D(6), 4D(7) and 4D(8). It is also possible to change the magnification of the image. For example, it is possible that only the width of the image is enlarged even though the length thereof is same. (see FIG. 4D(1)) Furthermore, processing of extracting a part inside of the letter (see FIG. 4D(2)), processing of changing an image condition from a negative image to a positive image and vice-versa (see FIG. 4D(3)), processing image information within an area designated by the operator on the original (see FIG. 4D(4)), and processing of double copying (see FIG. 4D(5)), etc. are executed selectively.

Figure 4E:
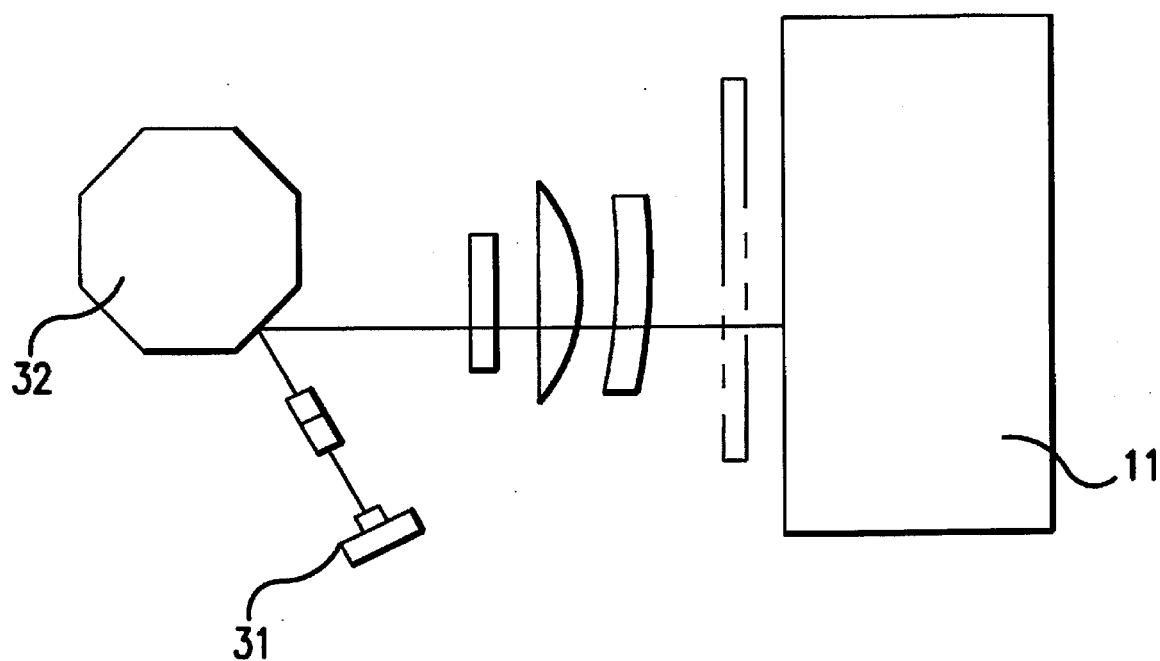

In a writing step, a laser diode 31 produces a laser beam corresponding to a signal which is calculated during the image processing step and irradiates the photo-conductive drum 11 through the polygon mirror 32, which rotates in a predetermined direction, thereby scanning the photo-conductive drum 11, as illustrated in FIG. 4E.

The various orientation problems which the present invention can handle are described by referring to an original document feeding direction, a direction of letters written thereon and a copy sheet direction in reference to FIG. 5. Both the first and second rows show modes where the letters (R1, R2) on the original document are written from left to right on the original document. As shown in the first row, the document is fed in the direction shown by the arrow A, namely in parallel to the longitudinal direction thereof by the document feeder 2 (See FIG. 1 or 2), and the copy sheet is fed in the same direction as shown by the arrow B. As a result, the letter R1 formed on one side of the duplex copy sheet is opposite to the other side's R2 illustrated using dotted lines and is upside down as shown in row 1.

Row 2 shows a preferable result with the direction of the letter formed on one side of the duplex copy sheet being the same as that of the other side. In this case, the direction of the letter written on the original documents is the same as the case as shown in row 1, but the originals are fed in a different direction as shown by the arrow in row 2. Namely, in row 2, the feeding direction of the original documents are parallel to the width thereof, while in row 1, the feeding direction is parallel to the longitudinal direction. Thereby, in the case as shown in row 2, a consistent duplex copying is obtained. This means that, if each of the duplex copy sheets are stapled at one side edge thereof, the letters written on the page can be read without difficulty.

In rows 3 and 4, each of the letters is written such that an orientation of the letter written on the original document is rotated by 90° from the letters on the original document as shown in rows 1 or 2. In the case as shown in row 3, the direction of the letter R1 formed on one side of the duplex copy sheet is the same as that of the other side (R2: written by dotted line). Because the original documents having the letters (R1, R2) written thereon from left to right are fed in parallel to the longitudinal direction thereof as shown in row 3 and a copy sheet is fed from the paper tray 15 in the direction as shown by the arrow B in the column 3, and inverted at the duplex tray 4, and further re-fed in the same direction as shown by the arrow B. In the case shown in row 4, the direction of the letter image formed on one side of the duplex copy is opposite to that of the other side, namely upside down because the originals having the letters (R1, R2) written thereon from left to right are fed in parallel to the width thereof as shown by the arrow A in the column 4.

The inconsistency of the letters (R1, R2) formed on both sides of the duplex copy sheet as shown in rows 1 and 4 come from the following causes. Namely, even if the first through last pages of the original documents are fed by the ADF in a predetermined order and direction, the re-feeding direction of the copy sheet from the duplex tray 4 becomes opposite to the feeding direction of the copy sheet read from the paper cassette 15. Namely, the leading edge of the copy sheet fed from the paper cassette 15 becomes the trailing edge at the time the above copy sheet is re-fed from the duplex tray 4 (See FIG. 1). In such a duplex copy machine, no problem exists in the case as shown in rows 2 and 3 because the direction of the letter formed on one side of the copy sheet becomes the same to the other side's.

However, in the case shown in rows 1 and 4, there exists a certain problem because the direction of the letter formed on one side of the duplex copy sheet becomes opposite to that of the other side. The problem results in a difficulty of reading the pages composed of the above duplex copy sheets when stapled at the left side thereof. The present invention can be applied to such cases (rows 1 and 4) where the duplex copy image becomes inconsistent as explained below. As shown in FIGS. 4D(6) and 4D(7), the image information read from the original document of FIG. 4C is digitized and the orientation thereof is rotated by 180° or 90° in a clockwise or counter-clockwise direction by the image processing device (See FIG. 3) corresponding to the mode, for example, as shown in rows 1 or 4 of FIG. 5. The invention will now be explained with reference to the various modes thereof.

(Mode: 1 & 2)

If the original documents having the letters written as shown in rows 1 or 4 and the copying sheets are fed in the direction as shown in rows 1 or 4 (mode 1 of 2), the orientation of the image information (R2) read from the second original is rotated by 180° from the image information (R1) read from the first original before forming the image on the second side of the copy sheet. Thereby, a consistent duplex copy sheet having the letters (R1, R2) being directed to the same direction as shown in rows 2 or 3, can be obtained.

Figure 10:
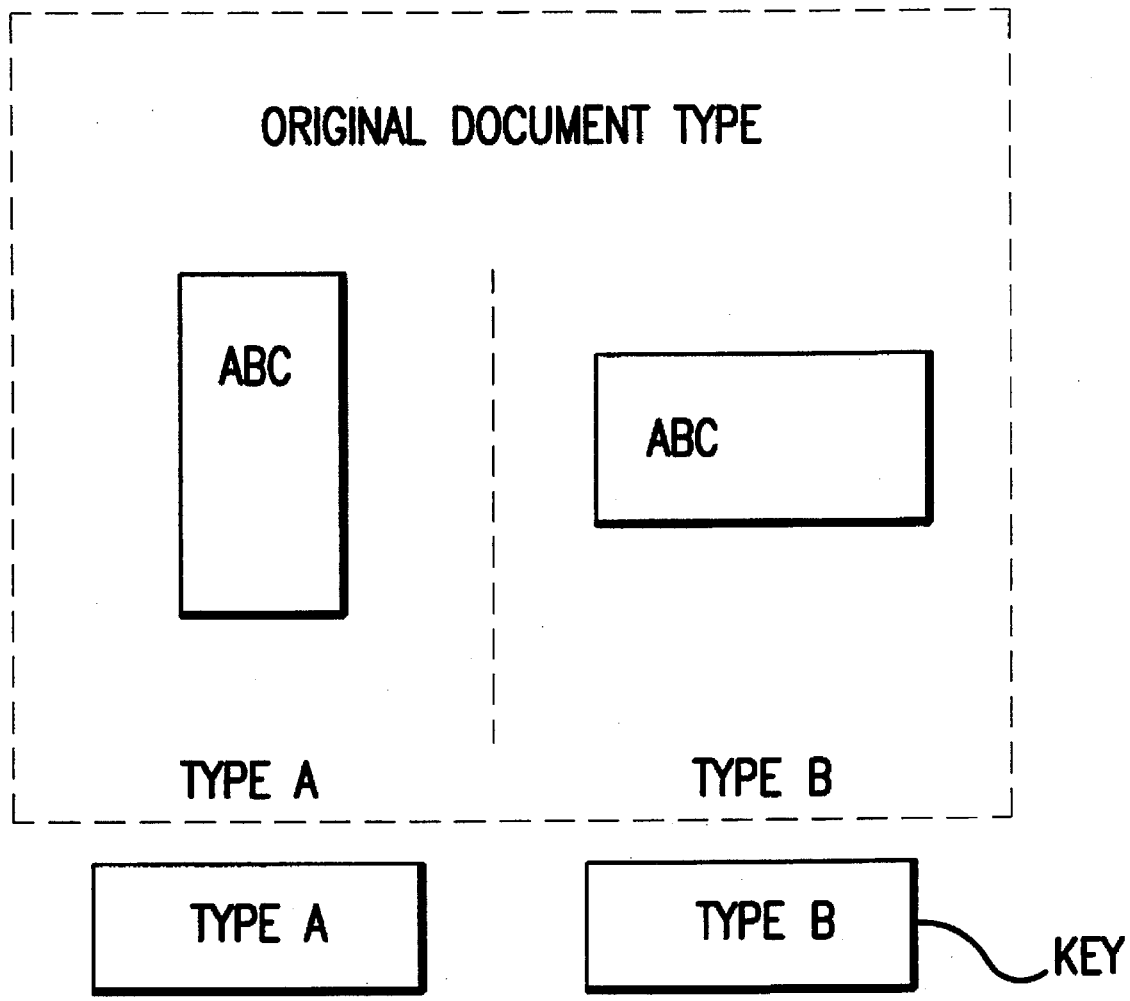
FIG. 10 is a plan view showing the original document type selecting key.

To execute the above and below mentioned processing rotation of the orientation of the page of the image, there is provided a key capable of setting each of the modes on the operation panel as shown in the FIG. 10, which is selected by the operator beforehand. An operator can select the key which represents a letter writing direction to set a predetermined mode. There is provided a sensor (202A, 202B, 202C) for detecting the feeding direction of the original document. Namely, the sensor 202A, 202B, or 202C detects whether the original document is fed in parallel with the longitudinal direction thereof or parallel to the width thereof.

(Mode: 3)

If the originals having the letters written as shown in row 1 are fed in the direction parallel to the longitudinal direction as shown in row 1, but copy sheets are fed in parallel to the width thereof as shown in row 2, the orientation of the first letter image information R1 and the second letter image information R2 are rotated by 90° in different directions by the image processing device (See FIG. 3) before each of the copy is made. Namely, for example, the former is rotated by 90° clockwise, while the latter is rotated by 90° counter-clockwise. Thereby, a consistent duplex copy sheet having the letters directed to the same direction as shown in row 2 is obtained.

(Mode: 4)

To the contrary, if the originals having the letters as shown in row 4 are fed in the direction in parallel to the width as shown in row 4, and the copy sheets are fed in parallel to the longitudinal direction thereof as shown in row 3, the orientation of both the first letter image information R1 and the second letter image information R2 are rotated by 90° in the same direction before each of the copies is formed by the copy sheet. Thereby, a consistent duplex copy as shown in row 3 can be obtained. As to the detection of the difference of the setting direction between the copy sheet and the original document, there is provided a sensor to detect the setting (or a feeding direction) direction of the copy sheet, not shown in the figures.

(Mode: 5)

If the original document has the image information both on the first and second side thereof, the duplex copy made therefrom becomes consistent, as far as an inverting direction of the original is the same as that of the copy sheet regardless of the direction of the letter written thereon. Therefore, the present invention is not needed to be applied to this case.

According to the embodiment as mentioned above, the consistent duplex copy is obtained without changing the setting of the copy sheet or the original document by the operator, so that he or she can avoid duplex copying problems.

The present invention can be applied to another duplex copying mode in which the feeding direction of the original document and that of the copy sheet is different, namely in a cross-relation with each other.

(Mode 6:)

When a duplex copy is formed from a document having images on both first and second side thereof, each of the copy images becomes opposite due to an inversion at the duplex copying tray 4. However, the orientation of the copy image information (composed of a digitized image signal) corresponding to the second side of the original document is rotated by the image processor (See FIG. 3) by 180° as mentioned above. Thereby, a consistent duplex copy can be obtained.

Figure 6:
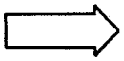
FIG. 6 is a table showing the relation of the feeding direction of the letter between the duplex copy sheet and the original document to be copied and having an image on both sides thereof.

In FIG. 6, four cases of the duplex copying where the conventional image forming device makes duplex copies improperly from an original document having images both on the sides thereof, is explained. Firstly, the case as shown in row 1 of FIG. 6 is explained.

(Mode 7:)

The original document having images both on the first and second side thereof and the letters written thereon from left to right, is fed in the direction as shown by the arrow C. The copy sheet is fed and re-fed perpendicular to the direction of that of the original as shown by the arrow D in row 1. The duplex copies become inconsistent with each other. Namely, each of the images are opposite as shown in row 1. Therefore, it is troublesome to read pages composed of such duplex copy sheets when the left sides thereof are stapled.

According to the present invention, the above-described inconsistency of the duplex copy images (the first and second side) is avoided by rotating the orientation of the letter image information (R1, R2) by 180° before being written on the duplex copy sheet.

(Mode: 8)

Another case of the duplex copying as shown in row 2 of FIG. 6 is explained below. An original document having images (R1, R2) both on the first and second side thereof and a letter (R1, R2) written thereon from left to right, is fed in the direction as shown by the arrow C. The copy sheet is fed and re-fed perpendicularly to the direction of that of the original as shown by the arrow D. As a result, the duplex copy becomes inconsistent as shown in row 2. Namely, the images are upside down.

According to the present invention, the above-mentioned inconsistency of the duplex copy (the first and second side) is avoided by rotating the orientation of the letter image information (R1, R2) by 180° before writing to one side of the duplex copy sheet.

(Mode: 9 & 10)

The same result occurs in the cases of the duplex copying as shown in rows 3 and 4, and the present invention can be applied in a same manner as described above. The original has images both on the first and second sides thereof and the letters are written thereon from the left to the right on the original document. Further, the copy sheet is fed and re-fed perpendicularly thereto. According to the present invention, the above-described inconsistency of the copy (the first and second side) is avoided by rotating the orientation of the letter image information by 180° before being written to one of the sides of the duplex copy sheet.

As to the setting of the above converting modes (Modes 7, 8, 9 and 10), there is provided a key capable of setting the mode on the operating board as explained above.

FIG. 6 shows the case where the setting direction of the original document and that of the copy sheet is the same. Below, the case where the setting direction of the original document and that of the copy sheet is not the same, namely, perpendicular to each other, is explained referring to FIG. 7.

The original having the letters written thereon from left to right is fed in the longitudinal direction thereof as shown in the second row of FIG. 6 and the copy sheet is fed in the longitudinal direction thereof and perpendicular to the direction of setting of the original. The present invention can be also applied as explained below.

(Mode: 11)

The orientation of the image information read from the first side of the original document is rotated by 90° and written on one side of the duplex copy sheet. After that, the original is inverted by the ADF as shown in FIGS. 9(a) and 9(b) and the original information of the second side thereof is read.

The rotation of the image information read from the second original as mentioned above is rotated by 90° in the same direction as above by the processing device (See FIGS. 3 and 4D(7)) in response to the command generated by the mode selecting key and written on another side of the duplex copy sheet. Thereby, a consistent duplex copy image is obtained as shown outside the column 1 in the table of FIG. 5.

To explain in more detail the above-described copying principle, the duplex copying is executed as explained below. At the time of writing the image information of the first side of the original as shown in row 2 in FIG. 6, the orientation of the image information (R1) is rotated by 90° and written to one side of the copy sheet as shown in FIG. 8(a). After that, the original document is inverted by the ADF as shown in FIG. 9(a), so that another side of the document having the second information R2 is set on the contact glass CG in the state as shown in FIG. 8(b). Then the image information R2 is read and the angle thereof is rotated 90° by the processing device (See FIG. 3) before being written on the second side of the duplex copy sheet in the state as shown in FIG. 8(c). At this stage, the orientation of the image on one side of the copy sheet is inconsistent with that of the other side by 180°. However, the leading edge of the copy sheet is inverted by the duplex copy unit 4 during re-feeding thereof. Thereby, the consistent duplex copy can be obtained as shown in FIG. 8(b).

(Mode: 12)

In the case of making the duplex copy from two original documents having an image only on one side thereof under the same condition as mentioned above, namely the setting direction of the original is not same to that of the copy sheet, the present invention can be also applied to obtain the same result.

Thereby, according to the present invention, the consistent duplex copy is obtained without changing the setting of the copy sheet or original document before the second copying.

Furthermore, when the original is fed in a direction parallel to the width thereof, the time period for inverting the copy sheet is minimized and the productivity of the duplex copy can be enhanced. Further, the number of cassettes to be set into the copies can be minimized.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A duplex copying apparatus, comprising:
    a scanner which reads images of original documents on a contact glass and generates image information;
    a digitizer which digitizes the image information read by the scanner;
    an image processor which processes the digitized image information and generates processed image information;
    a toner image forming device for forming, using toner, toner images corresponding to the processed image information;
    a copy sheet feeder for feeding blank copy sheets one by one from a plurality of blank copy sheets in a blank copy sheet tray to the toner image forming device to receive the toner image;
    a re-feeding device which inverts and re-feeds copy sheets from the toner image forming device which have toner images on one side thereof back to the toner image forming device to receive another toner image on another side thereof;
    a device which determines an orientation of the blank copy sheets in the blank copy sheet tray;
    a device which determines an orientation of the original documents;
    a device which determines an orientation of characters on the original documents; and
    a controller which analyzes the orientation of the blank copy sheets, the orientation of the original documents, and the orientation of the characters on the original documents and rotates, using the image processor, at least one of two images read using the scanner before the toner image forming device writes the two images on opposite sides of one of the blank copy sheets.

2. A duplex copying apparatus as defined in claim 1, further comprising:
    a key for setting a predetermined duplex copying mode, wherein the device which determines an orientation of characters on the original documents comprises a device for determining the predetermined duplex copying mode.

3. A duplex copying apparatus as defined in claim 1, further comprising:
    an automatic document feeder which feeds the original documents to the contact glass.

4. A duplex copying apparatus as defined in claim 1, further comprising:
    an automatic document feeder which feeds the original documents automatically to the contact glass, and after reading one side thereof by the scanner, ejects the original documents from the contact glass and inverts and feeds the original documents again to the contact glass.

5. A duplex copying apparatus according to claim 1, wherein:

the controller comprises a device for rotating, using the image processor, one of two digitized images obtained by reading, using the scanner, two separate original documents which each have an image on only one side thereof, the rotating occurring before forming toner images of the two separate original documents on opposite sides of one of the blank copy sheets using the toner image forming device and the re-feeding device.

6. A duplex copying apparatus according to claim 5, wherein:

the device for rotating one of the two digitized images rotates, using the image processor, the one of the two digitized images by 180° when the device which determines the orientation of the characters determines that the characters are written in a direction which is perpendicular to a feeding direction of the original documents which is determined by the device which determines the orientation of the original documents.

7. A duplex copying apparatus according to claim 1, wherein:

the controller comprises a device for rotating, using the image processor, one of two digitized images obtained by reading, using the scanner, a single original document which has images on both sides thereof, the rotating occurring before forming toner images of the two digitized images on opposite sides of one of the blank copy sheets using the toner image forming device and the re-feeding device.

8. A duplex copying apparatus according to claim 7, wherein:

the device for rotating one of the two digitized images rotates, using the image processor, the one of the two digitized images by 180° when the device which determines the orientation of the characters determines that the characters are written in a direction which is perpendicular to a feeding direction of the original documents which is determined by the device which determines the orientation of the original documents.

9. A duplex copying apparatus according to claim 1, wherein:

the controller comprises a device for rotating, using the image processor, two digitized images obtained by reading, using the scanner, two separate original documents which each have an image on only one side thereof, the rotating occurring before forming toner images of the two separate original documents on opposite sides of one of the blank copy sheets using the toner image forming device and the re-feeding device.

10. A duplex copying apparatus according to claim 9, wherein:

the device for rotating the two digitized images rotates, using the image processor, each of the two digitized images by 90° when the device which determines the orientation of the characters determines that the characters are written in a direction which is perpendicular to a feeding direction of the original documents which is determined by the device which determines the orientation of the original documents.

* * * * *